US007828433B2

(12) United States Patent
Katzman et al.

(10) Patent No.: US 7,828,433 B2
(45) Date of Patent: Nov. 9, 2010

(54) ASSYMETRICAL PROGRESSIVE LENS

(75) Inventors: Dan Katzman, Givat Ela (IL); Gabby Weinrot, Upper Galilee (IL)

(73) Assignee: Shamir Optical Industry, Upper Galilee (IL)

( * ) Notice: Subject to any disclaimer, the term of this patent is extended or adjusted under 35 U.S.C. 154(b) by 0 days.

(21) Appl. No.: 12/255,772

(22) Filed: Oct. 22, 2008

(65) Prior Publication Data

US 2010/0097570 A1   Apr. 22, 2010

(51) Int. Cl.
G02C 7/06   (2006.01)
(52) U.S. Cl. ...................................... 351/168; 351/161
(58) Field of Classification Search ............. 351/161, 351/168, 169, 171
See application file for complete search history.

(56) References Cited

U.S. PATENT DOCUMENTS 4,315,673 A * 2/1982 Guilino et al. ............. 351/169
6,149,271 A * 11/2000 Menezes et al. ............ 351/169
2005/0280775 A1 * 12/2005 Esser et al. ................ 351/168

* cited by examiner

Primary Examiner—Darryl J Collins
(74) Attorney, Agent, or Firm—Pearl Cohen Zedek Latzer LLP

(57) ABSTRACT

Progressive lens for viewing a field of vision having at least a first portion including objects in a first range of distances from a viewer and a second portion including objects in a second range of distances from the viewer, the lens comprising: at least two different power zones, the first power zone having lens power required by the viewer for the first range of distances of viewed objects from the viewer, and the second power zone having lens power required by the viewer for the second range of distances of viewed objects from the viewer, wherein the size and location on the lens of the first power zone correspond to size and location in the field of vision of the first portion, and wherein the size and location on the lens of the second power zone correspond to size and location in said field of vision of the second portion.

3 Claims, 2 Drawing Sheets

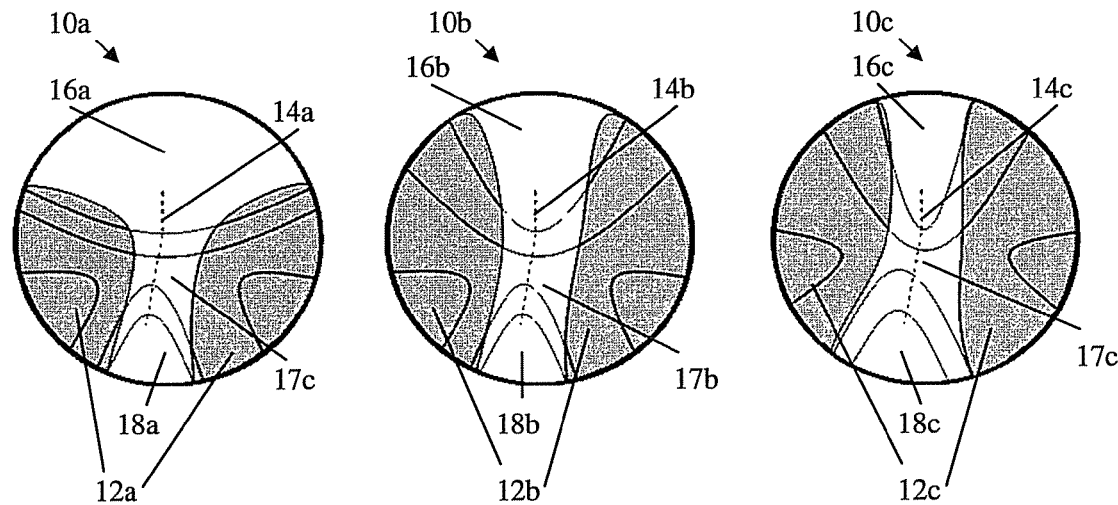
Fig. 1
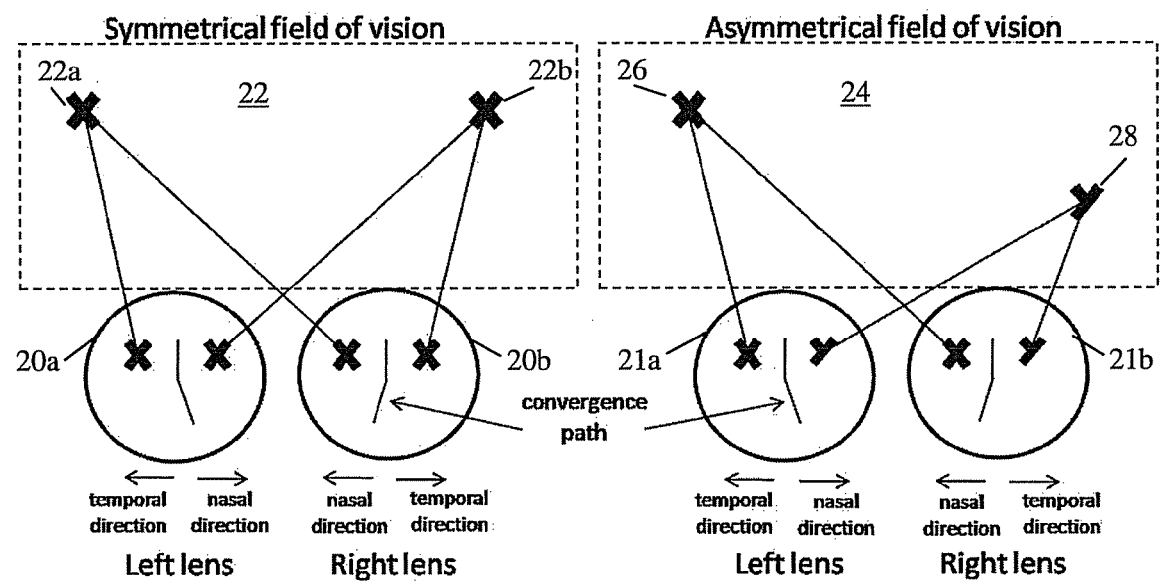
Fig. 2a
Fig. 2b

ASSYMETRICAL PROGRESSIVE LENS

BACKGROUND OF THE INVENTION

Progressive lenses are usually used by persons who need different lens power for different distances. Conventional progressive lenses usually designed in agreement with the fact that usually a wearer lowers his gaze in order to look at close distances. The design of conventional progressive lenses is usually based on two main assumptions: it is assumed that the main usage of the lens is along its vertical central meridian, with possible deviation to account for small eye convergence for near vision tasks, and it is assumed that the objects' distances distribution is symmetrical with respect to central vertical meridian of the visual field.

These assumptions make it possible, and indeed that is what usually being done, to make the lens design for one eye (left or right) as the "mirror reflection" of the lens design for the other eye (for the same prescription) in terms of its power and astigmatism distributions across the lens.

However, the conventional design may result in primarily vertical or almost vertical power distribution. Sometimes, the power distribution of the lens is matched to specific vertical object distribution of wearer's visual field. In this conventional approach the areas on the sides of the lens usually regarded as disturbing distortion areas, caused by power progression along vertical central meridian of the lens, in which lens designers try by various methods to minimize the distortion.

As a result of the conventional design described above, the lens may limit the wearer's horizontal natural eyes movement and forces him to use his head to look at the sides. This in turn may result in a lens being suitable for only horizontally symmetrical visual tasks.

SUMMARY OF THE INVENTION

Embodiments of the present invention may provide progressive lens for viewing a field of vision having at least a first portion including objects in a first range of distances from a viewer and a second portion including objects in a second range of distances from said viewer, the lens may comprise: at least two different power zones, the first power zone having lens power required by the viewer for the first range of distances of viewed objects from the viewer, and the second power zone having lens power required by the viewer for said second range of distances of viewed objects from the viewer, wherein the size and location on the lens of the first power zone may correspond to size and location in the field of vision of the first portion, and wherein the size and location on the lens of the second power zone may correspond to size and location in the field of vision of the second portion.

The power zones on the progressive lens according to embodiments of the present invention may be distributed at least partially horizontally along the lens.

The horizontal distribution of the power zones along the progressive lens according to embodiments of the present invention may be asymmetrical in accordance to a horizontal asymmetrical distribution of distances of objects in the field of vision from the viewer.

Embodiments of the present invention may provide a pair of right and left progressive lenses for right and left eyes of a viewer, respectively, wherein distribution of the power zones on each of the lenses may be substantially different from distribution of the power zones on the other lens and from distribution of the power zones on a mirror copy of the other lens.

The power zones on each lens of the pair of right and left progressive lenses according to embodiments of the present invention may be substantially different from corresponding power zones on the other lens or on a mirror copy of said other lens, the difference may be in at least one of a list comprising power of the lens, shape and location on the lens of said power zones.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1 is a schematic illustration of conventional right lens power distribution designs;

FIGS. 2a and 2b are schematic illustrations of two pairs of left and right lenses in symmetrical and asymmetrical fields of vision, respectively, according to embodiments of the present invention.

Figure 3:
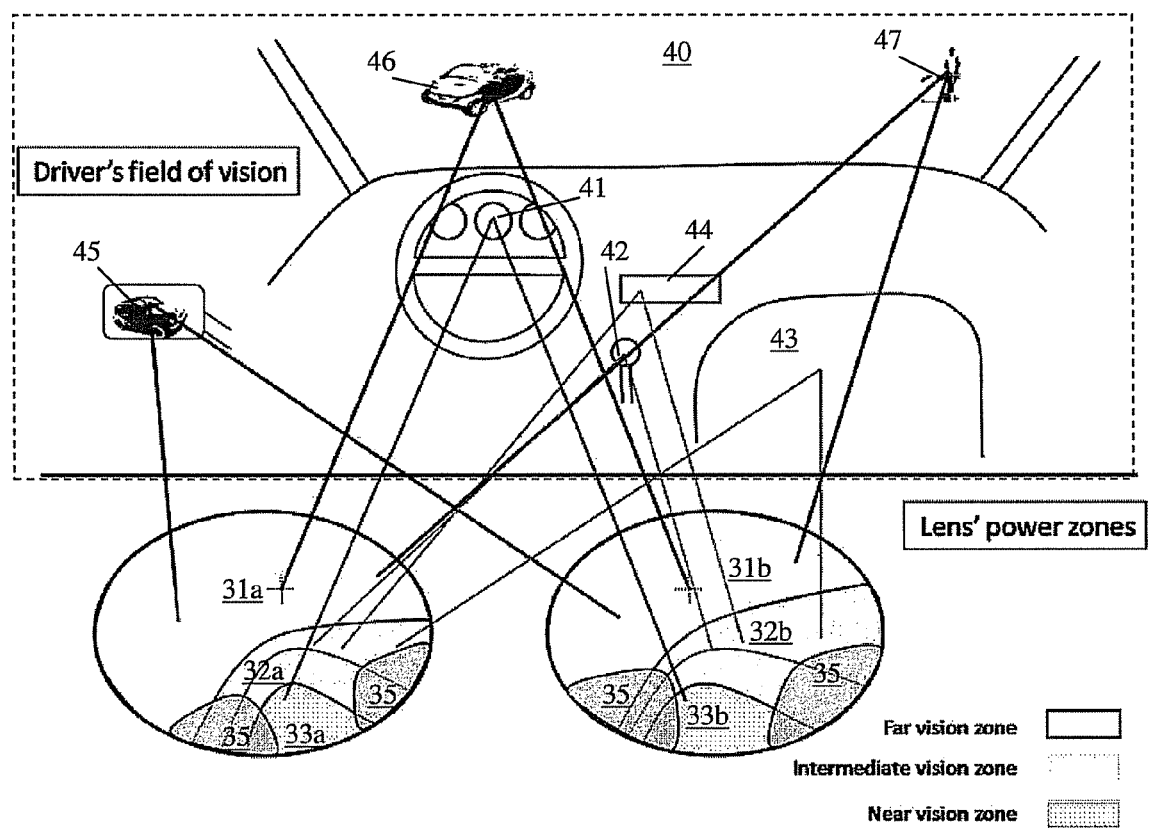
FIG. 3 is a schematic illustration of asymmetrical pair of lenses for an asymmetrical field of vision according to one embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Reference is now made to FIG. 1, which is a schematic illustration of conventional right lens power distribution designs 10a, 10b and 10c. Power distribution designs 10a, 10b and 10c include respective far vision power zones 16a, 16b and 16c, intermediate vision power zones 17a, 17b and 17c, and near vision power zones 18a, 18b and 18c. Far vision power zones 16a, 16b and 16c may be located at the upper portion of power distribution designs 10a, 10b and 10c, for example, because users of lens tend to raise their gaze when looking at far distances. Near vision power zones 18a, 18b and 18c may be located at the lower portion of power distribution designs 10a, 10b and 10c, for example, because users of lens tend to lower their gaze when looking at short distances.

Designs 10a, 10b and 10c of conventional progressive lenses may base on an assumption that the main usage of the lens is along a substantially vertical central meridian, with possible deviation to account for small eye convergence for near vision tasks, marked by convergence paths 14a, 14b and 14c. Additionally or alternatively, designs 10a, 10b and 10c of conventional progressive lenses may base on an assumption that the distribution of distances of viewed objects from the viewer is substantially symmetrical with respect to convergence paths 14a, 14b and 14c.

Therefore, conventional designs 10a, 10b and 10c may have primarily vertical or almost vertical power distribution. The power distribution of the lens may be matched to specific vertical object distribution of the wearer's visual field. The areas on the sides of the lens in conventional designs 10a, 10b and 10c may usually be regarded as disturbing distortion areas 12a, 12b and 12c, marked in FIG. 1 by the grey areas, which may be caused by power progression along convergence paths 14a, 14b and 14c of the lens, in which lens designers may try by various methods to minimize the distortion.

Based on the assumption that the main usage of the lens is along a substantially vertical central meridian, and/or based on the assumption that the distribution of distances of viewed objects from the viewer is substantially symmetrical with respect to convergence paths 14a, 14b and 14c, power distribution designs of left lenses for the same prescription corresponding to power distribution designs of right lenses 10a, 10b and 10c may be produced, for example, by creating a "mirror reflection" copy of the power and astigmatism distributions across the right lens designs 10a, 10b and 10c.

However, conventional designs 10a, 10b and 10c may limit the wearer's horizontal natural eyes movement, for example, because of distortion areas 12a, 12b and 12c, and may force him to move his head in order to look at the sides. Therefore, conventional designs 10a, 10b and 10c may be suitable only for horizontally symmetrical visual tasks.

Reference is now made to FIGS. 2a and 2b, which are schematic illustrations of two pairs of left and right lenses, e.g., left lens 20a and right lens 20b viewing a horizontally symmetrical field of vision 22 and left lens 21a and right lens 21b viewing a horizontally asymmetrical field of vision 24, according to embodiments of the present invention. In FIG. 2a, the distribution of distances of viewed objects from the viewer is substantially horizontally symmetrical. Symmetrical field of vision 22 may include, for example, objects 22a and 22b. Object 22a may be viewed through substantially corresponding locations on the left portions of lenses 20a and 20b, and object 22b may be viewed through substantially corresponding locations on the right portions of lenses 20a and 20b. Objects 22a and 22b may have substantially the same distance from a viewer wearing lenses 20a and 20b. Therefore, lenses 20a and 20b may be symmetrical to each other and, for example, may be produced by mirror duplications of each other, without damaging the vision quality of a viewer who requires different lens power for different distances.

However, usually the lens wearer is situated in an environment comprises of objects located at different distances from a person and in many cases the distribution of the objects' distances over the field of vision is not symmetrical horizontally.

In FIG. 2b, the distribution of distances of viewed objects from the viewer is substantially horizontally asymmetrical. Asymmetrical field of vision 24 may include, for example, objects 26 and 28. Object 26 may be viewed by wearer of lenses 21a and 21b through substantially corresponding locations on the left portions of lenses 21a and 21b, and object 28 may be viewed through by wearer of lenses 21a and 21b substantially corresponding locations on the right portions of lenses 21a and 21b. Objects 26 and 28 may have different distances from a viewer wearing lenses 21a and 21b. Therefore, in order that both objects 26 and 28 may be viewed properly by a viewer with multifocal vision requirements, for example, who requires different lens power for different distances, lenses 21a and 21b may have to be horizontally asymmetrical by themselves and/or to each other.

Reference is now made to FIG. 3, which is a schematic illustration of asymmetrical pair of lenses 30a and 30b for viewing an exemplary asymmetrical field of vision 40 according to one embodiment of the present invention. Field of vision 40 may be asymmetrical with respect to distribution of distances of viewed objects from the viewer. Exemplary asymmetrical field of vision 40 may be, for example, a field of vision of a driver in a car. Exemplary asymmetrical field of vision 40 may include close objects, for example, in his lower and lower-right portions of field of vision 40, such as close objects 41, 42, 43 and 44. Close objects 41, 42, 43 and 44 may include, for example, the dashboard, radio, phone, the glove compartment, a passenger next to the driver, or any other close objects, for example, within the car. Exemplary asymmetrical field of vision 40 may include far objects, for example, in his left and upper right portions of field of vision 40, such as far objects 45, 46, and 47. Far objects 45, 46 and 47 may include, for example, cars, roads, landscape, or any other far objects, for example, outside the car.

Objects 41, 42, 43, 44, 45, 46 and 47 may be viewed by the left and right eyes of the viewer through different power areas of lenses 30a and 30b, respectively. Field of view 40 may be viewed slightly differently by each of the eyes. Therefore, for example, since distribution of distances of viewed objects 41, 42, 43, 44, 45, 46 and 47 from the viewer may be asymmetrical, the different power areas of lens 30a may have different shape than the different power areas of lens 30b.

Lenses 30a and 30b may include horizontally asymmetrical distribution of power and/or astigmatism over their surface, for example, in order to match asymmetrical field of view 40 and multifocal vision requirements of the viewer. Lenses 30a and 30b may include, for example, far vision zones 31a and 31b, intermediate vision zones 32a and 32b and near vision zones 33a and 33b. Lenses 30a and 30b may also include distortion areas 35a and 35b which may be caused by power progression along the lens.

Far vision zones 31a and 31b may have power of the lens suitable for viewing far objects 45, 46 and 47. The size and location on the lens of each of far vision zones 31a and 31b may correspond to size and location in field of vision 40 of a portion of field of vision 40 including objects at far distance from the viewer, for example, far objects 45, 46 and 47. Therefore, for example, objects 45, 46 and 47 may be viewed naturally and comfortably by the viewer through zones 31a and 31b. Far vision zones 31a and 31b may be asymmetrical about a central vertical axis of lenses 30a and 30b, for example, in order to conform to asymmetrical field of vision 40. Additionally, far vision zone 31a of lens 30a may be different from far vision zone 31b of lens 30b in shape and/or in location on the lens and/or in power of the lens.

Intermediate vision zones 32a and 32b may have power of the lens suitable for viewing intermediate distance objects 42, 43 and 44. The size and location on the lens of each of intermediate vision zones 32a and 32b may correspond to size and location in field of vision 40 of a portion of field of vision 40 including objects at intermediate distance from the viewer, for example, intermediate distance objects 42, 43 and 44. Therefore, for example, objects 42, 43 and 44 may be viewed naturally and comfortably by the viewer through zones 32a and 32b. Intermediate vision zones 32a and 32b may be asymmetrical about a central vertical axis of lenses 30a and 30b, for example, in order to conform to asymmetrical field of vision 40. Additionally, intermediate vision zone 32*a* of lens 30*a* may be different from intermediate vision zone 32*b* of lens 30*b* in shape and/or in location on the lens and/or in power of the lens.

Near vision zones 33*a* and 33*b* may have power of the lens suitable for viewing near object 41. The size and location on the lens of each of near vision zones 33*a* and 33*b* may correspond to size and location in field of vision 40 of a portion of field of vision 40 including objects at small distance from the viewer, for example, near object 41. Therefore, for example, object 41 may be viewed naturally and comfortably by the viewer through zones 33*a* and 33*b*. Near vision zones 33*a* and 33*b* may be asymmetrical about a central vertical axis of lenses 30*a* and 30*b*, for example, in order to conform to asymmetrical field of vision 40. Additionally, near vision zone 33*a* of lens 30*a* may be different from near vision zone 33*b* of lens 30*b* in shape and/or in location on the lens and/or in power of the lens.

Therefore, lenses 30*a* and 30*b* may enable the wearer to make a full use of the lens surface by naturally moving his eyes in horizontal direction as well as in vertical direction.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. Progressive lens for viewing a field of vision having at least a first portion including objects in a first range of distances from a viewer and a second portion including objects in a second range of distances from said viewer, the lens comprising:

at least two different power zones, the first power zone having lens power required by said viewer for said first range of distances of viewed objects from said viewer, and the second power zone having lens power required by said viewer for said second range of distances of viewed objects from said viewer, wherein the size and location on the lens of said first power zone correspond to the size and location in said field of vision of said first portion, and wherein the size and location on the lens of said second power zone correspond to the size and location in said field of vision of said second portion, and wherein said first and said second power zones are distributed at least partially horizontally with respect to each other and in a manner which is asymmetrical with respect to a meridian line of the lens.

2. A pair of a right progressive lens and a left progressive lens for right and left eyes of a viewer, respectively, each of the lenses is a lens according to claim 1, wherein distribution of said power zones on each of the lenses is substantially different from distribution of said power zones on the other lens and from distribution of said power zones on a mirror copy of said other lens, wherein said right progressive lens is for the same prescription as said left progressive lens.

3. A pair of a right progressive lens and left progressive lens according to claim 2, wherein the power zones on each lens is substantially different from corresponding power zones on the other lens or on a mirror copy of said other lens, the difference is in at least one of a list comprising power of the lens, shape and location on the lens of said power zones.

* * * * *